(No Model.)
M. B. WESSON.
ICE HOOK.
No. 524,230.
Patented Aug. 7, 1894.
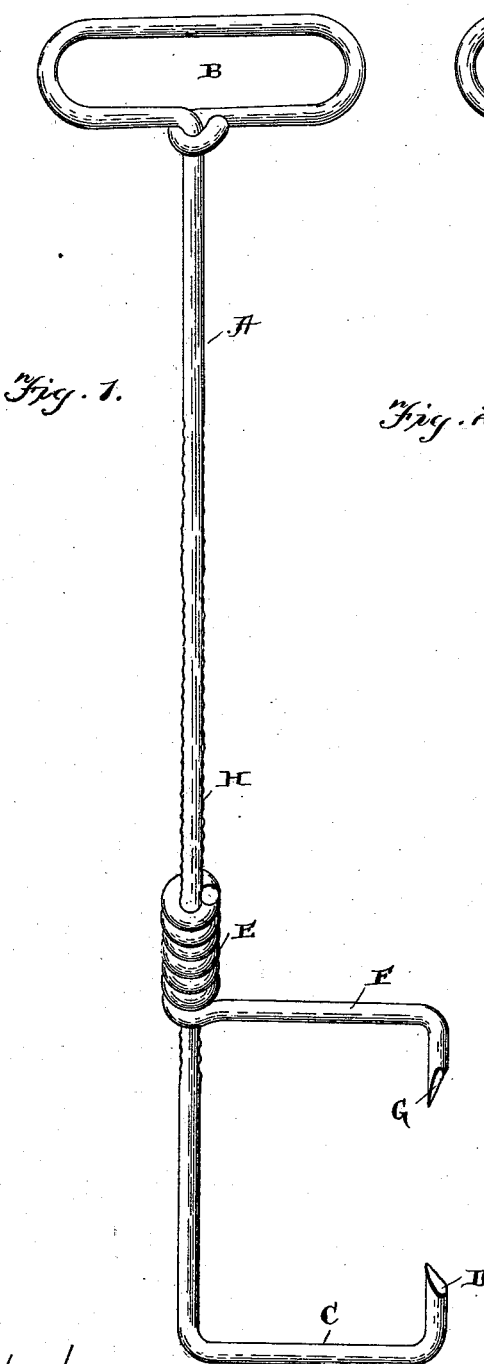
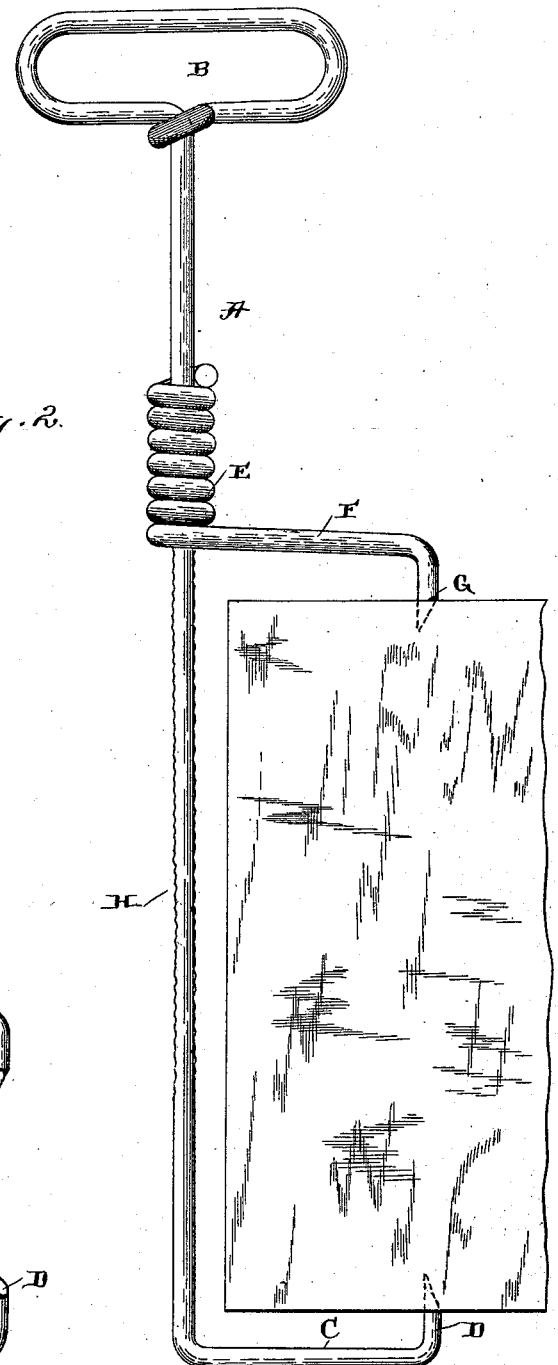

UNITED STATES PATENT OFFICE.

MILEY B. WESSON, OF FORT WORTH, TEXAS.

ICE-HOOK.

SPECIFICATION forming part of Letters Patent No. 524,230, dated August 7, 1894.

Application filed May 23, 1894. Serial No. 512,216. (No model.)

*To all whom it may concern:*

Be it known that I, MILEY B. WESSON, of Fort Worth, in the county of Tarrant and State of Texas, have invented certain new and useful Improvements in Ice-Hooks; and I do hereby declare the following to be a full, clear, and exact description of the invention, such as will enable others skilled in the art to which it pertains to make and use it, reference being had to the accompanying drawings, which form part of this specification.

My invention relates to an improvement in ice hooks and the object of the same is to provide a simple and inexpensive device which will secure a most effectual hold on the ice to be lifted or carried and which may be readily operated by one hand.

The invention consists in the novel features of construction hereinafter fully described and claimed, and illustrated in the accompanying drawings, in which—

Figure 1 is a perspective view of my improved hook. Fig. 2 is an elevation of the same showing its position when engaged with a piece of ice.

A designates the main stem of the hook having the hand hold B formed at its upper end as shown and the angular bend or extension C at its lower which terminates with the upturned point D. The extension and the point thus constitute the lower hook of the implement and it will be noticed that this portion as well as the stem and hand hold are formed of a single piece of wire. The movable hook consists of the wire coils E encircling the stem and adapted to move longitudinally thereon, and having its lower end extended laterally as shown at F which terminates in the downwardly projecting point G.

In operation the lower or stationary hook of the implement is thrust into the block of ice to be carried and the movable hook moved against the opposite side or edge of the same and forced thereinto as shown in Fig. 2. The stem of the device being roughened as indicated at H the movable hook portion will not readily slip so that a most effectual hold is secured on the block of ice, and the same if not too heavy may be readily carried by one hand as will be understood.

The device is simple and very cheap in construction, being formed of but two pieces of wire, and will most effectually perform the function for which it is provided.

Having thus fully described my invention, what I claim as new, and desire to secure by Letters Patent, is—

1. An improved ice hook comprising a stem having a hook at its lower end, a coil movable on the stem, and the movable hook formed by projecting outward and downward the lower end of said coil, substantially as shown and described.

2. An improved ice hook comprising a stem having its lower end turned at an angle as shown, the stationary hook of the implement formed by turning upward the free end of said lateral extension, a coil movable on the stem, and a hook formed by extending outward the lower end of the coil and turning downwardly the said outwardly extending portion to form the movable hook, substantially as shown and described.

In testimony whereof I affix my signature in presence of two witnesses.

MILEY B. WESSON.

Witnesses:
H. W. HARPER,
F. A. BEAUMONT.